(12) United States Patent
Chen et al.

(10) Patent No.: US 10,466,523 B2
(45) Date of Patent: Nov. 5, 2019

(54) DISPLAY DEVICE

(71) Applicant: InnoLux Corporation, Miao-Li County (TW)

(72) Inventors: Jian-Cheng Chen, Miao-Li County (TW); Hao-Yu Liou, Miao-Li County (TW); Hong-Sheng Hsieh, Miao-Li County (TW); Yu-Sheng Chen, Miao-Li County (TW); Chung-Kuang Wei, Miao-Li County (TW); Tsung-Ta Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 66 days.

(21) Appl. No.: 15/800,639

(22) Filed: Nov. 1, 2017

(65) Prior Publication Data
US 2018/0120625 A1 May 3, 2018

Related U.S. Application Data

(60) Provisional application No. 62/442,454, filed on Jan. 5, 2017, provisional application No. 62/416,679, filed on Nov. 2, 2016.

(30) Foreign Application Priority Data

Jul. 10, 2017 (CN) .......................... 2017 1 0556291

(51) Int. Cl.
*G02F 1/1335* (2006.01)
*G02F 1/1333* (2006.01)
*G06F 3/041* (2006.01)

(52) U.S. Cl.
CPC .... *G02F 1/133502* (2013.01); *G02F 1/13338* (2013.01); *G02F 1/133512* (2013.01);
(Continued)

(58) Field of Classification Search
CPC ......... G02F 1/133502; G02F 1/133528; G02F 1/13338; G02F 1/133512; G02F 2201/38;
(Continued)

(56) References Cited

U.S. PATENT DOCUMENTS 6,157,426 A * 12/2000 Gu .................... G02F 1/133512
257/72
2011/0249339 A1* 10/2011 Horie ................ G02F 1/133512
359/601
(Continued)

*Primary Examiner* — Shan Liu
(74) *Attorney, Agent, or Firm* — McClure, Qualey & Rodack, LLP (57) ABSTRACT

A display device is provided. The display device includes a first substrate, a second substrate, a base layer, a first shielding layer, and a first optical adjustment layer. The second substrate has a third surface and a fourth surface. The base layer is disposed between the first substrate and the second substrate. The first shielding layer is disposed between the first substrate and the base layer and defines a first shielding region and a first non-shielding region. The first optical adjustment layer is disposed between the first shielding layer and the second substrate. The thickness of the first optical adjustment layer is in a range from 1 µm to 3 µm. The reflectance of the first optical adjustment layer is in a range from 0.05% to 1.2%.

15 Claims, 7 Drawing Sheets

(52) U.S. Cl.
CPC ...... *G02F 1/133528* (2013.01); *G06F 3/0412* (2013.01); *G02F 2201/38* (2013.01); *G02F 2202/28* (2013.01); *G06F 2203/04107* (2013.01)

(58) Field of Classification Search
CPC ....... G02F 2202/28; G02F 2001/13312; G02F 1/136209; G02F 1/0311; G02F 1/116; G02F 1/1335; G02F 1/133536; G02F 1/13362; G02F 1/133533; G02F 2001/133531; G02F 2001/133521; G02F 2001/13356; G02F 2001/133538; G02F 2001/133541; G02F 2001/133543; G02F 2001/133545; G02F 2001/133548; G02F 2001/13355; G02F 2001/133562; G02F 2001/133567; G02F 2203/16; G06F 3/0412; G06F 2203/04107; G06F 3/0421; G06F 3/044; G06F 3/045; G06F 3/041; G06F 3/0414; G06F 3/0416; G06F 3/0488; G06F 2203/04103; G06K 11/06; H01J 11/44; H01J 2211/444; H01J 2329/323; H01J 29/327; B29D 11/00644; B32B 17/10458; B32B 2307/42; H01L 51/5293; H01R 12/7005; H04B 10/532; G01J 5/0825; G02B 5/3033; G02B 6/0056; G02B 6/02109; G03F 9/7065; G01R 33/3678; C09K 19/0208

USPC .............. 349/12, 110, 111, 96–103; 345/173

See application file for complete search history.

(56) References Cited

U.S. PATENT DOCUMENTS

| | | | |
|---|---|---|---|
| 2015/0123926 A1* | 5/2015 | Kang | H01H 1/10 345/173 |
| 2016/0041658 A1* | 2/2016 | Ting | G02B 1/14 345/173 |
| 2016/0048253 A1* | 2/2016 | Chen | G06F 3/0412 345/173 |
| 2016/0131943 A1* | 5/2016 | Murakami | G02F 1/133528 349/12 |
| 2016/0306224 A1* | 10/2016 | Ishikawa | G02F 1/133512 |
| 2017/0235176 A1* | 8/2017 | Oishi | G02F 1/13338 349/12 |
| 2017/0269440 A1* | 9/2017 | Yoshitomi | G02F 1/134309 |

* cited by examiner

DISPLAY DEVICE

CROSS REFERENCE TO RELATED APPLICATIONS

This application claims priority of China Patent Application No. 201710556291.6, filed on Jul. 10, 2017, which claims the benefit of priority from a provisional application of U.S. Patent Application No. 62/416,679 filed on Nov. 2, 2016 and a provisional application of U.S. Patent Application No. 62/442,454 filed on Jan. 5, 2017, the entirety of which are incorporated by reference herein.

BACKGROUND

Technical Field

The embodiments of the present disclosure relate to a display device, and in particular to a display device with a shielding layer.

Description of the Related Art

As technology keeps advancing, various information devices keep being upgraded, such as cell phones, tablets, ultrabooks, satellite navigation, and so on. In addition to the use of a keyboard or a mouse, the use of touch technology to control information devices is very intuitive and popular. Touch display devices are equipped with a user-friendly and intuitive input and operation interface, which allows users of any age to select or control information devices using their fingers or stylus pens.

Current display devices are not satisfactory in every aspect. For example, if the light reflectance of a display device is too high, the user may see the pattern of a touch electrode in the display device, degrading the display quality.

Therefore, a display device that can lower the difference between the reflectance of a display area and the reflectance of a non-display area, or that can lower the reflectance of the display device is still needed to raise the display quality.

SUMMARY

Some embodiments of the present disclosure provide a display device. The display device includes a first substrate having a first surface and a second surface opposite to the first surface, and a second substrate having a third surface and a fourth surface, wherein the second surface of the first substrate is opposite to the third surface of the second substrate. The display device also includes a base layer disposed between the first substrate and the second substrate, wherein the base layer has a fifth surface opposite to the second surface and a sixth surface opposite to the third surface. The display device further includes a first shielding layer disposed between the first substrate and the base layer and defining a first shielding region and a first non-shielding region. In addition, the display device includes a first optical adjustment layer disposed between the first shielding layer and the second substrate, wherein the thickness of the first optical adjustment layer is in a range from 1 μm to 3 μm, and the reflectance of the first optical adjustment layer is in a range from 0.05% to 1.2%.

Some embodiments of the present disclosure provide a display device. The display device includes a first substrate having a first surface and a second surface opposite to the first surface, and a second substrate having a third surface and a fourth surface, wherein the second surface of the first substrate is opposite to the third surface of the second substrate. The display device also includes a base layer disposed between the first substrate and the second substrate, wherein the base layer has a fifth surface opposite to the second surface and a sixth surface opposite to the third surface; an adhesion layer disposed between the base layer and the second substrate. In addition, the display device further includes a first light transmissive layer disposed between the adhesion layer and the second substrate, and a second light transmissive layer disposed between the adhesion layer and the base layer, wherein a refractive index of the adhesion layer is substantially equal to a half of the sum of a refractive index of the first light transmissive layer and a refractive index of the second light transmissive layer.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

The display devices of some embodiments of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. Sometimes those exemplary embodiments may be combined together. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" typically means +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about".

The terms "substantially" typically means 90% of the stated value, more typically 95% of the stated value, more typically 98% of the stated value, and even more typically 99% of the stated value.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

This description of the exemplary embodiments is intended to be read in connection with the accompanying drawings, which are to be considered part of the entire written description. The drawings are not drawn to scale. In addition, structures and devices are shown schematically in order to simplify the drawing.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The term "substrate" is meant to include devices formed within a transparent substrate and the layers overlying the transparent substrate. All transistor element needed may be already formed over the substrate. However, the substrate is represented with a flat surface in order to simplify the drawing. The term "substrate surface" is meant to include the uppermost exposed layers on a transparent substrate, such as an insulating layer and/or metallurgy lines.

In some embodiments of the present disclosure, a multi-layered optical adjustment layer is disposed on a shielding layer of a display area, which can reduce a light reflectance of a display device, thereby raising the display quality. In addition, in some embodiments of the present disclosure, an optical adjustment layer is disposed on a shielding layer of a peripheral area, which can lower the difference between the reflectance of a non-display area and reflectance of the display area, thereby raising the display quality of the display device.

Figure 1:
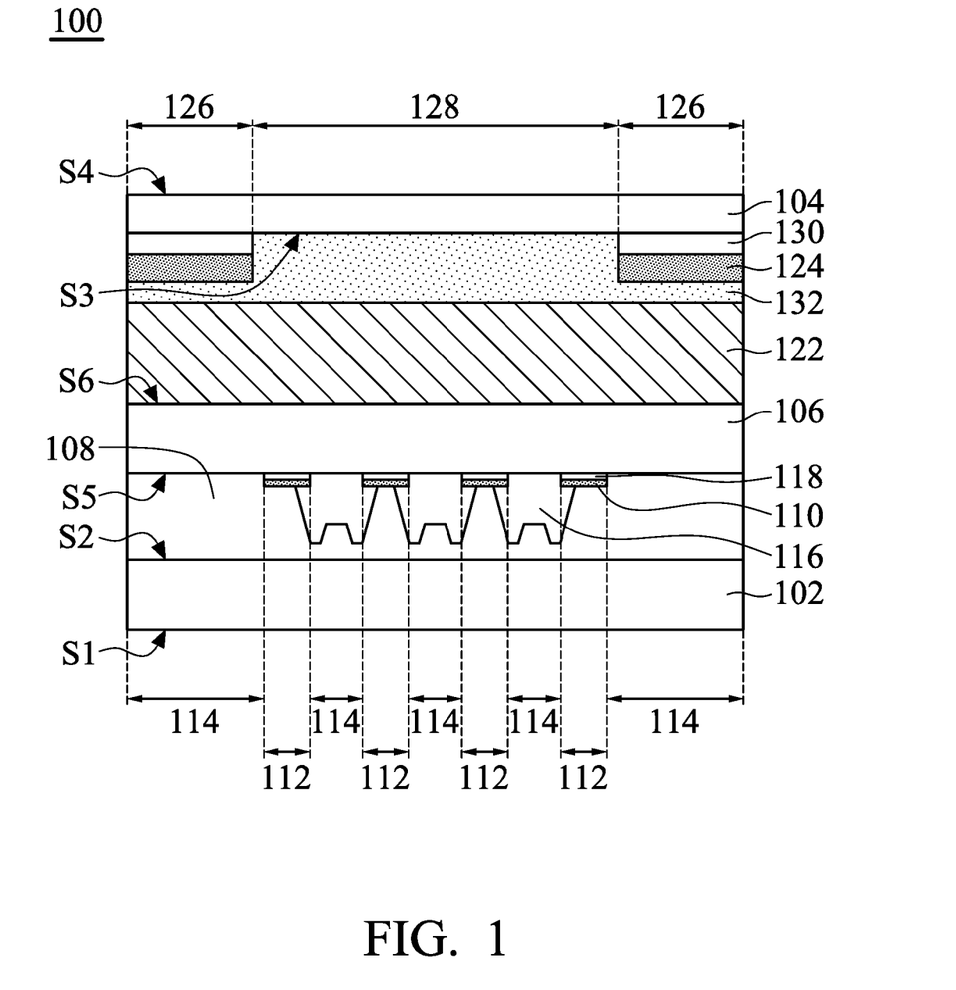
FIG. 1 is a cross-sectional view of a display device in accordance with some embodiments of the present disclosure.

Referring to FIG. 1, FIG. 1 is a cross-sectional view of a display device 100 according to some embodiments of the present disclosure. As illustrated in FIG. 1, in accordance with some embodiments of the present disclosure, the display device 100 includes a first substrate 102. The first substrate 102 has a first surface S1 and a second surface S2 opposite to the first surface S1. The first substrate 102 may include a glass material layer, a ceramic material layer, a plastic material layer, or any other suitable material layer. In some embodiments of the present disclosure, the first substrate 102 can include a flexible substrate, and the material of the flexible substrate is, for example, polyethylene terephthalate (PET), polyimide, polycarbonate, a combination thereof, or any other suitable material. In some embodiments of the present disclosure, the first substrate 102 can be a thin film transistor substrate and can include thin film transistors disposed thereon or therein.

Still referring to FIG. 1, according to some embodiments of the present disclosure, the display device 100 includes a second substrate 104 having a third surface S3 and a fourth surface S4 opposite to the third surface S3. The second substrate 104 may include a glass material layer, a ceramic material layer, a plastic material layer, or any other suitable material layer. In some embodiments of the present disclosure, the second substrate 104 can include a flexible substrate, and the material of the flexible substrate is, for example, polyethylene terephthalate (PET), polyimide, polycarbonate, a combination thereof, or any other suitable material.

As shown in FIG. 1, the second surface S2 of first substrate 102 is opposite to the third surface S3 of the second substrate 104 in accordance with some embodiments of the present disclosure.

Still referring to FIG. 1, according to some embodiments of the present disclosure, the display device 100 further includes a base layer 106 disposed between the first substrate 102 and the second substrate 104. The base layer 106 includes a fifth surface S5 and a sixth surface S6 opposite to the fifth surface S5. The fifth surface S5 is opposite to the second surface S2 of the first substrate 102. The sixth surface S6 is opposite to the third surface S3 of the second substrate 104.

The base layer 106 may include a glass material layer, a ceramic material layer, a plastic material layer, a flexible material layer, a packaging material layer, or any other suitable material layer. In some embodiments of the present disclosure, the material of the flexible material layer is, for example, polyethylene terephthalate (PET), polyimide, polycarbonate, a combination thereof, or any other suitable material. In some embodiments of the present disclosure, the packaging material layer may be, for example, an insulation layer. For example, an organic insulation layer, an inorganic insulation layer, and an organic insulation layer are stacked in sequence to form the insulation layer. In some embodiments of the present disclosure, the packaging material layer can also be a single layer of an organic insulation layer.

Still referring to FIG. 1, according to some embodiments of the present disclosure, the display device 100 further includes a display medium layer 108 disposed between the first substrate 102 and the base layer 106. In some embodiments of the present disclosure, a material of the display medium layer 108 can be liquid crystal. The liquid crystal can include nematic, smectic, cholesteric, blue phase, or any other suitable type of liquid crystal. In other embodiments, the display medium layer 108 can also be an organic light-emitting layer of organic light-emitting diodes (OLED), an inorganic light-emitting layer of micro LEDs, or a quantum light-emitting layer of quantum dots light-emitting diodes (QLED).

Still referring to FIG. 1, in accordance with some embodiments of the present disclosure, the display device 100 further includes a first shielding layer 110 disposed between the first substrate layer 102 and the second substrate layer 104. In some embodiments of the present disclosure, the first shielding layer 110 is disposed on the fifth surface S5 of the base layer 106. To be more specific, as shown in FIG. 1, the first shielding layer 110 is disposed between the first substrate layer 102 and the base layer 106 and on the fifth surface S5 of the base layer 106. In some embodiments of the present disclosure, the first shielding layer 110 can include a black photoresist, black printing ink or a black resin, As shown in FIG. 1, according to some embodiments of the present disclosure, the first shielding layer 110 defines a first shielding region 112 and a first non-shielding region 114. The first shielding region 112 is the region corresponding to the first shielding layer 110, and the first non-shielding region 114 is the region that does not correspond to the first shielding layer 110.

Still referring to FIG. 1, according to some embodiments of the present disclosure, the display device 100 further include a plurality of light conversion components 116 disposed on the fifth surface S5 of the base layer 106. In addition, as shown in FIG. 1, according to some embodiments of the present disclosure, each light conversion component 116 is disposed corresponding to one first non-shielding region 114. The light conversion components 116 can be formed of a color filter material (e.g. a color filter), a light absorbing material (e.g. a material containing a pigment or a dye), a light conversion material (e.g. a phosphor, a quantum dots (QD), or any other material that can convert light), or a combination thereof.

In some embodiments of the present disclosure, the light conversion components 116 can include a red light conversion component, a green light conversion component, a blue light conversion component, or any other suitable light color conversion component.

Still referring to FIG. 1, according to some embodiments of the present disclosure, the display device 100 further includes a first optical adjustment layer 118 disposed between the first shielding layer 110 and the second substrate 104. In these embodiments, the first optical adjustment layer 118 is disposed on the fifth surface S5 of the base layer 106. The first optical adjustment layer 118 has a thickness in a range between 1 µm and 3 µm. In addition, the first optical adjustment layer 118 has a reflectance in a range between 0.05% and 1.25%, such as between 0.3% and 1.0%. In the disclosure, the reflectance of a layer is referred to as a percentage of an amount of external light irradiating into the display device 100 and reflected by the layer. For example, but not as limiting examples, the reflectance of the first optical adjustment layer 118 is referred to as a percentage of an amount of external light irradiating into the display device 100 and reflected by the first optical adjustment layer 118.

In some embodiments of the present disclosure, the material of the first optical adjustment layer 118 can include a resin, printing ink, a photoresist, or any other suitable material. In some embodiments of the present disclosure, the first optical adjustment layer 118 can be an optical filter layer, such as a red filter layer, a green filter layer, a blue filter layer, a gray filter layer, or any other suitable color filter layer. In some embodiments of the present disclosure, a light transmittance of the first optical adjustment layer 118 is greater than a light transmittance of the first shielding layer 110 and smaller than a light transmittance of the base layer 106. In some embodiments of the present disclosure, the light transmittance of the first optical adjustment layer 118 is in a range between 60% and 5%, such as between 20% and 10%.

In some embodiments of the present disclosure, the light reflectance of the display device 100 can be decreased and the possibility of users seeing the pattern of touch electrodes of the display device 100 can also be reduced by disposing the first optical adjustment layer 118 on the first shielding layer 110 and the light transmittance of the first optical adjustment layer 118 being smaller than the light transmittance of the base layer 106, which raises display quality.

In some embodiments of the present disclosure, the light reflectance of the overall display device can be decreased and the reflected light can have a smaller color shift by disposing an optical adjustment layer with low transmittance on the first shielding layer 110.

Figure 2:
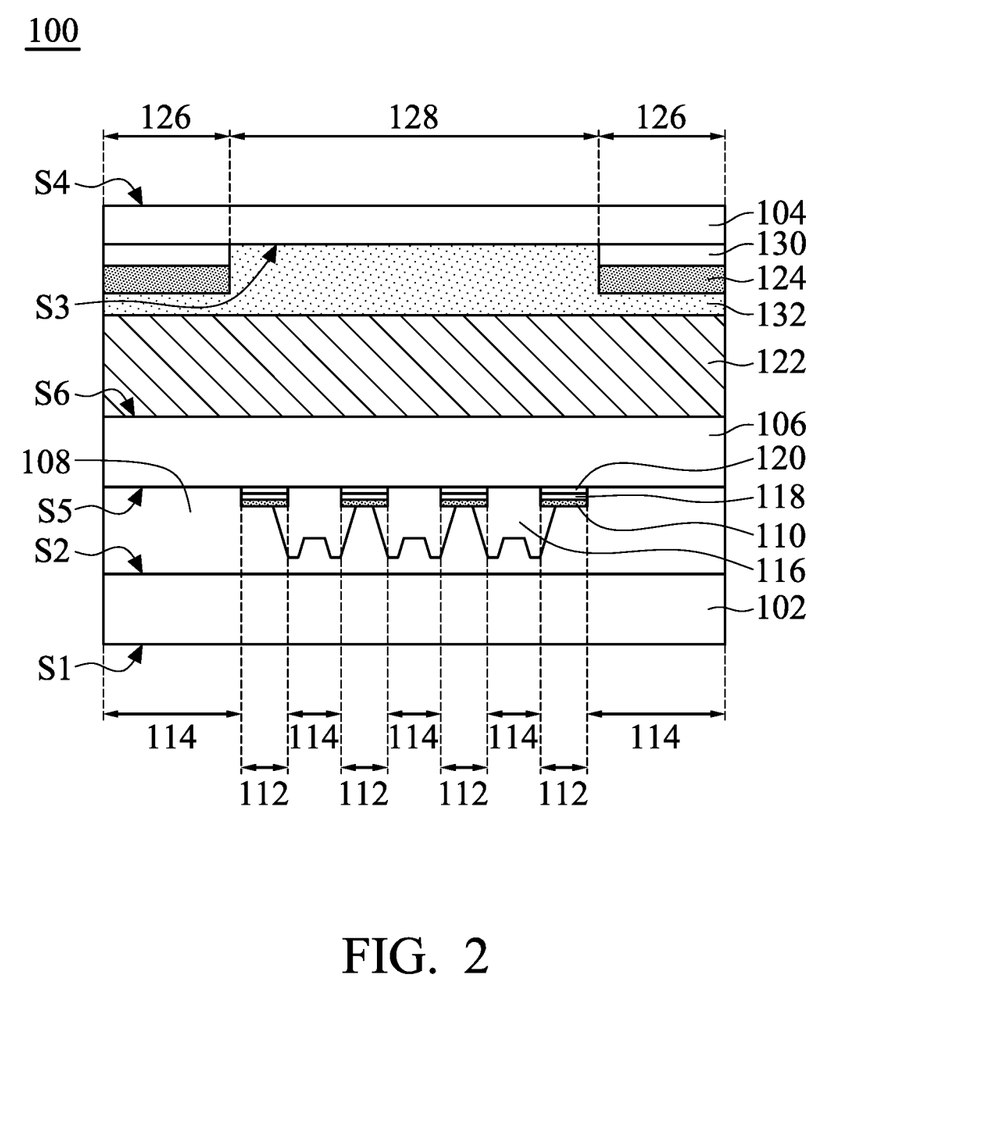
FIG. 2 is a cross-sectional view of a display device in accordance with some embodiments of the present disclosure.

As shown in FIG. 2, in some other embodiments of the present disclosure, the display device 100 further includes a second optical adjustment layer 120, and the second optical adjustment layer 120 is disposed between the base layer 106 and the first optical adjustment layer 118. The second optical adjustment layer 120 has a thickness in a range between 1 µm and 3 µm, and a reflectance of the second optical adjustment layer 120 is between 0.05% and 1.25%, such as between 0.3% and 1.0%. In the disclosure, the reflectance of the second optical adjustment layer 120 is referred to as a percentage of an amount of external light irradiating into the display device 100 and reflected by the second optical adjustment layer 120.

In some embodiments of the present disclosure, the material of the second optical adjustment layer 120 can include a resin, printing ink, a photoresist, or any other suitable material. In some embodiments of the present disclosure, the second optical adjustment layer 120 can be an optical filter layer, such as a red filter layer, a green filter layer, a blue filter layer, a gray filter layer, or any other suitable color filter layer. In some embodiments of the present disclosure, a light transmittance of the second optical adjustment layer 120 is greater than a light transmittance of the first shielding layer 110, and smaller than a light transmittance of the base layer 106. In some embodiments of the present disclosure, the light transmittance of the second optical adjustment layer 120 is in a range between 60% and 5%, such as between 20% and 10%.

In some embodiments of the present disclosure, the first optical adjustment layer 118 and the second optical adjustment layer 120 are optical filter layers of different colors. In addition, in some embodiments of the present disclosure, light transmittance refers to human visual function light transmittance while light reflectance refers to human visual function light reflectance. In addition to considering the light intensity after each color of light penetrates the first optical adjustment layer 118 and the second optical adjustment layer 120, human visual function light transmittance also considers the photosensitivity of the human eye to the color of the light. In addition to considering the light intensity after light of each color is reflected, human visual function light reflectance also considers the photosensitivity of the human eye to the color of the light.

In some embodiments of the present disclosure, by disposing the first optical adjustment layer 118 and the second optical adjustment layer 120 on the first shielding layer 110 and the light transmittances of the first optical adjustment layer 118 and the second optical adjustment layer 120 being smaller than the light transmittance of the base layer 106, the light reflectance of the display device 100 can be decreased and the possibility of users seeing the pattern of touch electrodes of the display device 100 can also be reduced, which raises display quality.

Furthermore, in some embodiments of the present disclosure, the light reflectance can be further reduced and the reflected light can have a smaller color shift by disposing a bilayered optical adjustment layer with different color filters (i.e., the first optical adjustment layer 118 and the second optical adjustment layer 120), instead of a single-layered optical adjustment layer, on the first shielding layer 110.

as a red filter layer with a thickness of 2 μm), and the shielding layer is disposed on the red optical adjustment layer. In other words, in embodiment 1, a single-layered optical adjustment layer is disposed between the base layer and the shielding layer.

As illustrated in the stack structure of table 1, in embodiment 2, the green optical adjustment layer is disposed on the base layer, wherein the thickness of the green optical adjustment layer is 2 μm (such as a green filter layer with a thickness of 2 μm), and the shielding layer is disposed on the green optical adjustment layer. In other words, in embodiment 2, a single-layered optical adjustment layer is disposed between the base layer and the shielding layer.

As illustrated in the stack structure of table 1, in embodiment 3, the blue optical adjustment layer is disposed on the base layer, wherein the thickness of the blue optical adjustment layer is 2 μm (such as a blue filter layer with a thickness of 2 μm), and the shielding layer is disposed on the blue optical adjustment layer. In other words, in embodiment 3, a single-layered optical adjustment layer is disposed between the base layer and the shielding layer.

As illustrated in the stack structure of table 1, in embodiment 4, the blue optical adjustment layer is disposed on the base layer, wherein the thickness of the blue optical adjustment layer is 2 μm (such as a blue filter layer with a thickness of 2 μm), the red optical adjustment layer is disposed on the blue optical adjustment layer, wherein the thickness of the red optical adjustment layer is 2 μm (such as a red filter layer with a thickness of 2 μm), and the shielding layer is disposed on the red optical adjustment layer. In other words, in embodiment 4, a bilayered optical adjustment layer is disposed between the base layer and the shielding layer.

TABLE 1

| | comparative example 1 | embodiment 1 | embodiment 2 | embodiment 3 | embodiment 4 | embodiment 5 |
|---|---|---|---|---|---|---|
| stack structure | base layer/ shielding layer | base layer/ red optical adjustment layer/ shielding layer | base layer/ green optical adjustment layer/ shielding layer | base layer/ blue optical adjustment layer/ shielding layer | base layer/ blue optical adjustment layer/ red optical adjustment layer/ shielding layer | base layer/ red optical adjustment layer/ blue optical adjustment layer/ shielding layer |
| first color difference value | 0.0 | 15.4 | −21.9 | 11.6 | 3.4 | 3.4 |
| second color difference value | 0.0 | 24.7 | 9.4 | −21.7 | −8.7 | 20.8 |
| light reflectance % | 1.00% | 0.26% | 0.51% | 0.06% | 0.00% | 0.11% |

Figure 3A:
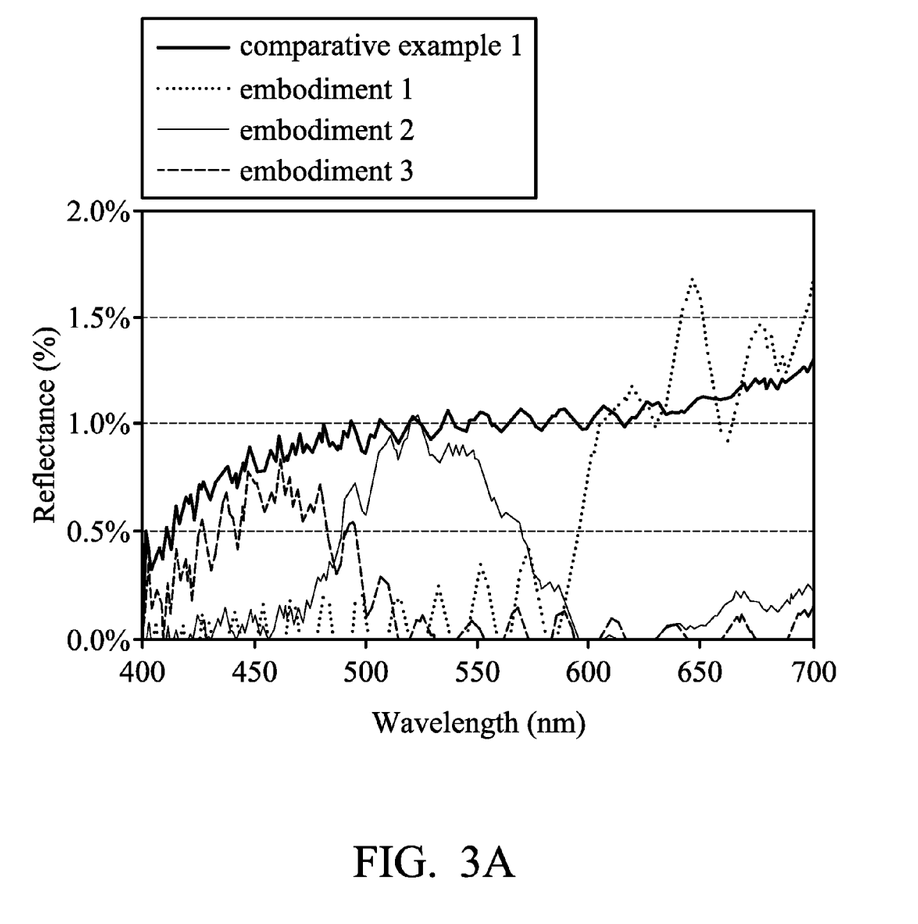
FIG. 3A is a spectral analysis diagram of the reflected lights of some comparative examples.
Figure 3B:
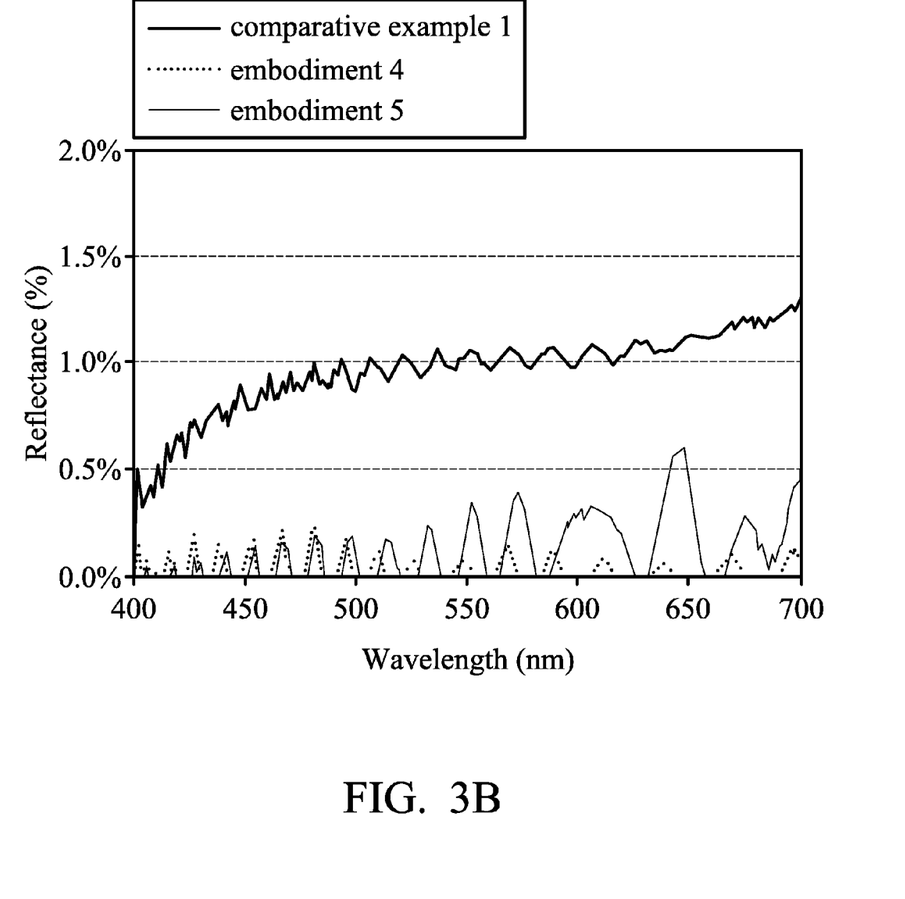
FIG. 3B is a spectral analysis diagram of the reflected lights of some embodiments of the present disclosure and comparative examples.

Table 1 demonstrates the first color difference values, the second color difference values, and the light reflectances of comparative example 1 and embodiments 1-5. FIG. 3A is a spectral analysis diagram of the reflected lights of comparative example 1 and embodiments 1-3. FIG. 3B is a spectral analysis diagram of the reflected lights of embodiments 4-5 and comparative example 1.

As illustrated in the stack structure of table 1, in comparative example 1, the shielding layer (e.g. the first shielding layer) is directly disposed on the base layer and no optical adjustment layer is disposed between the base layer and the shielding layer. In embodiment 1, a red optical adjustment layer is disposed on the base layer, wherein a thickness of the red optical adjustment layer is 2 μm (such As illustrated in the stack structure of table 1, in embodiment 5, the red optical adjustment layer is disposed on the base layer, wherein the thickness of the red optical adjustment layer is 2 μm (such as a red filter layer with a thickness of 2 μm), the blue optical adjustment layer is disposed on the red optical adjustment layer, wherein the thickness of the blue optical adjustment layer is 2 μm (such as a blue filter layer with a thickness of 2 μm), and the shielding layer is disposed on the blue optical adjustment layer. In other words, in embodiment 5, a bilayered optical adjustment layer is disposed between the base layer and the shielding layer.

The thicknesses of the optical adjustment layers discussed in the above embodiments are simply used for exemplary illustration, but not used to limit the present disclosure. However, in the above embodiments, the thickness of the optical adjustment layer cannot be too thick or too thin. If the thickness of the optical adjustment layer is too thick, such as larger than 4 μm, the reflectance of the display device will be increased due to the change of the optical density of the material. If the thickness of the optical adjustment layer is too thin, such as smaller than 0.5 μm, the reflectance of the display device will not be adjusted due to the insufficient optical density of the material.

In addition, the first color difference values, the second color difference values, and the light reflectances of table 1 are obtained by International Commission on Illumination (CIE) Lab color space system. The coordinates of the CIE Lab has three dimensions of L, a, and b. The dimension of L refers to brightness, and the dimensions of a and b refer to color opposition. In some embodiments of the present disclosure, the light reflectance is the value of the dimension of L. In some embodiments of the present disclosure, the light reflectance is obtained by integrating the spectral diagrams of FIGS. 3A and 3B.

In some embodiments of the present disclosure, the first color difference values of table 1 are obtained by the following method. First, in comparative example 1, except for the interference of the shielding layer, the interferences of the other film layers (e.g. the base layer) in optics are deducted to obtain the value of a of the CIE Lab coordinates with only the presence of the shielding layer in comparative example 1. Next, in embodiments 1 to 5, except for the interferences of the shielding layer and the optical adjustment layer, the interference of the other film layers (e.g. the base layer) in optics are deducted to obtain the values of a of the CIE Lab coordinates with only the presence of the shielding layer and with the presence of one or more optical adjustment layers in embodiments 1 to 5. Next, the values of a in embodiments 1 to 5 are minus the value of a in comparative example 1, and the first color difference values of embodiments 1 to 5 are obtained. Since the first color difference value is obtained using the above method, the first color difference value of comparative example 1 is 0.

In some embodiments of the present disclosure, the second color difference values of table 1 are obtained by the following method. First of all, in comparative example 1, except for the interference of the shielding layer, the interferences of the other film layers (e.g. the base layer) in optics are deducted to obtain the value of b of CIE Lab coordinates with only the presence of the shielding layer in comparative example 1. Next, in embodiments 1 to 5, except for the interferences of the shielding layer and the optical adjustment layer, the interferences of the other film layers (e.g. the base layer) in optics are deducted to obtain the values of b of CIE Lab coordinates with only the presence of the shielding layer and with the presence of one or more optical adjustment layers in embodiments 1 to 5. Next, the values of b of embodiments 1 to 5 are minus the value of b of comparative example 1, and the second color difference values of embodiments 1 to 5 are obtained. Since the second color difference value is obtained by the above method, the second color difference value of comparative example 1 is 0.

From table 1, comparative example 1, and embodiments 1-3, it can be understood that the reflectance of the display area of the display device can be reduced by disposing the red optical adjustment layer, the green optical adjustment layer, or the blue optical adjustment layer on the shielding layer, thereby improving the display quality.

From table 1, embodiments 3 and 4, it can be understood that the light reflectance can be reduced from 0.06% to 0.00% by disposing an additional red optical adjustment layer between the blue optical adjustment layer and the shielding layer. In addition, the first color difference value and the second color difference value can also be reduced by disposing an additional red optical adjustment layer between the blue optical layer and the shielding layer. It can be seen that, compared to disposing only a single-layered optical adjustment layer between the shielding layer and the base layer, disposing a bilayered or multilayered optical adjustment layer between the shielding layer and the base layer can reduce the light reflectance, the first color difference value, and the second color difference value, thereby improving the display quality.

In addition, from table 1 and embodiments 1 and 5, it can be understood that the light reflectance can be reduced from 0.26% to 0.11% by disposing an additional blue optical adjustment layer between the red optical adjustment layer and the shielding layer. In addition, the first color difference value and the second color difference value can also be reduced by disposing an additional blue optical adjustment layer between the red optical layer and the shielding layer. It can be seen that, compared to disposing only a single-layered optical adjustment layer between the shielding layer and the base layer, disposing a bilayered or multilayered optical adjustment layer between the shielding layer and the base layer can reduce the light reflectance, the first color difference value, and the second color difference value, thereby raising the display quality.

Still referring to FIG. 1, according to some embodiments of the present disclosure, the display device 100 further includes a touch layer 122 disposed between the first substrate 102 and the second substrate 104. In some embodiments of the present disclosure, the touch layer 122 is disposed between the base layer 106 and the second substrate 104 and on the sixth surface S6 of the base layer 106.

Still referring to FIG. 1, according to some embodiments of the present disclosure, the display device 100 further includes a second shielding layer 124 disposed on the third surface S3 of the second substrate 104. In some embodiments of the present disclosure, the second shielding layer 124 can include a black photoresist, black printing ink, or a black resin.

As shown in FIG. 1, according to some embodiments of the present disclosure, the second shielding layer 124 defines a second shielding region 126 and a second non-shielding region 128. The second shielding region 126 is the region corresponding to the second shielding layer 124, and the second non-shielding region 128 is the region that does not correspond to the region of the second shielding layer 124. In some embodiments of the present disclosure, the second shielding region 126 (also referred to as a peripheral area) can correspond to the peripheral area of the display device 100 and the second non-shielding region 128 (also referred to as a display area or an active area) can correspond to the display area or the active area of the display device 100. In other embodiments of the present disclosure, an area of the second non-shielding region 128 can be slightly larger than an area of the display area or the active area of the display device 100. In other words, a projection of the display area or the active area of the display device 100 is within a projection of the second non-shielding region 128, wherein the first shielding region 112 and the second shielding region 126 can partially overlap to create a better light-shielding effect. Nevertheless, the dispositions of the first shielding region 112 and the second shielding region 126 are not limited to this embodiment. According to practical needs, the dispositions of the first shielding region 112 and the second shielding region 126 can coordinate with each other to partially overlap, completely overlap, or not overlap in a partial region.

In addition, in some embodiments of the present disclosure, as shown in FIG. 1, the light conversion components 116 can be disposed corresponding to the second non-shielding region 128, and can also be selectively disposed corresponding to the second shielding region 126. In addition, in some embodiments of the present disclosure, as shown in FIG. 1, the touch layer 122 is disposed between the second shielding layer 124 and the base layer 106.

Still referring to FIG. 1, according to some embodiments of the present disclosure, the display device 100 further includes a third optical adjustment layer 130 disposed between the second substrate 104 and the second shielding layer 124. The third optical adjustment layer 130 can be formed of a conductive material or an insulation material. In some embodiments of the present disclosure, the conductive material can be formed of a transparent conductive material, such as indium tin oxide (ITO), SnO, indium zinc oxide (IZO), indium gallium zinc oxide (IGZO), indium tin zinc oxide (ITZO), antimony tin oxide (ATO), antimony tin oxide (AZO), a combination thereof or any other suitable transparent conductive oxide material. In some embodiments of the present disclosure, the third optical adjustment layer 130 can be formed of an insulation material, such as silicon nitride, silicon dioxide, silicon oxynitride, resin or any other suitable insulation material.

In some embodiments of the present disclosure, a refractive index of the second substrate 104 is different from a refractive index of the third optical adjustment layer 130. In some embodiments of the present disclosure, the refractive index of the third optical adjustment layer 130 is different from a refractive index of the second shielding layer 124, wherein the refractive index of the second substrate 104 can be the same as or different from the refractive index of the second shielding layer 124, which is not specifically limited herein. Due to the difference between the above refractive indices, incident light can be reflected at the interface of the second substrate 104 and the third optical adjustment layer 130 and/or at the interface of the third optical adjustment layer 130 and the second shielding layer 124, which increases the light reflectance of the peripheral area 126.

In general, if the third optical adjustment layer 130 of the embodiments of the present disclosure is not disposed, the light reflectance of the display area 128 will be greater than the light reflectance of the peripheral area 126. Because of this, disposing a third optical adjustment layer 130 with a thickness between 4 μm and 11 μm can increase the light reflectance of the peripheral area 126, which makes the light reflectance of the peripheral area 126 close to or substantially equal to the light reflectance of the display area 128. The display quality of the display device 100 can be improved by decreasing the difference between the light reflectance of the peripheral area 126 and the light reflectance of the display area 128.

In some embodiments of the present disclosure, the refractive index of the second substrate 104 is from about 1.45 to about 1.55, such as from about 1.47 to about 1.53. In some embodiments of the present disclosure, the refractive index of the third optical adjustment layer 130 is from about 1.65 to about 1.75, such as from about 1.67 to about 1.73. In some embodiments of the present disclosure, the refractive index of the second shielding layer 124 is from about 1.45 to about 1.55, such as from about 1.47 to about 1.53.

In some embodiments of the present disclosure, the second non-shielding region 128 has a first reflectance, the second substrate 104 has a second reflectance, the second shielding layer 124 has a third reflectance, and the third optical adjustment layer 130 has a fourth reflectance, wherein the fourth reflectance substantially equals the first reflectance minus the second reflectance and the third reflectance.

Still referring to FIG. 1, according to some embodiments of the present disclosure, the display device 100 further includes an adhesion layer 132 disposed between the second substrate 104 and the touch layer 122. In some embodiments of the present disclosure, a portion of the adhesion layer 132 is disposed between the second shielding layer 124 and the touch layer 122. In some embodiments of the present disclosure, the adhesion layer 132 can be formed of an optical gel, which is, however, not limited in the present disclosure. As long as the gel is a light transmissive gel with adhesive property, the gel is the so-called optical gel in the present disclosure.

It should be noted that the embodiments of the present disclosure are not limited to the structure illustrated in FIG. 1. In other embodiments of the present disclosure, the touch layer 122 can be disposed on the second surface S2 of the first substrate 102. In still other embodiments of the present disclosure, the touch layer 122 can be disposed on the third surface S3 of the second substrate 104.

Figure 4:
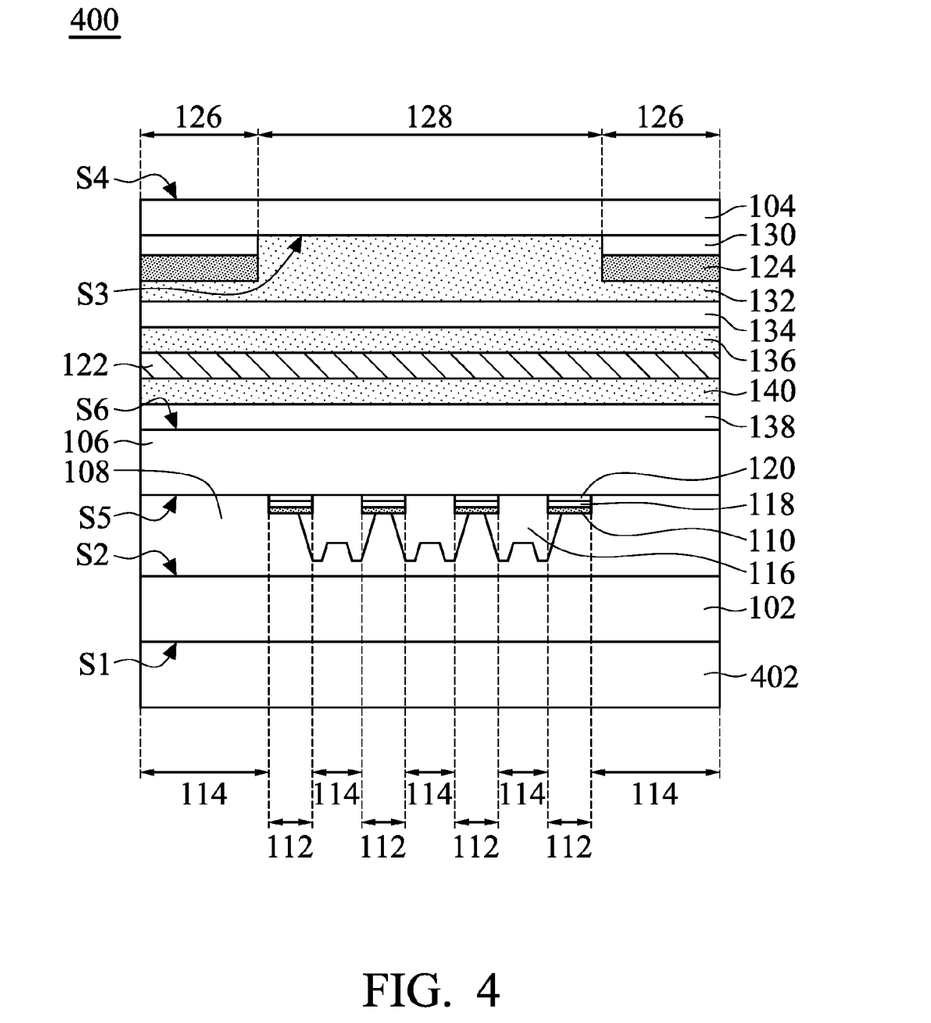
FIG. 4 is a cross-sectional view of a display device in accordance with some embodiments of the present disclosure.
Figure 5:
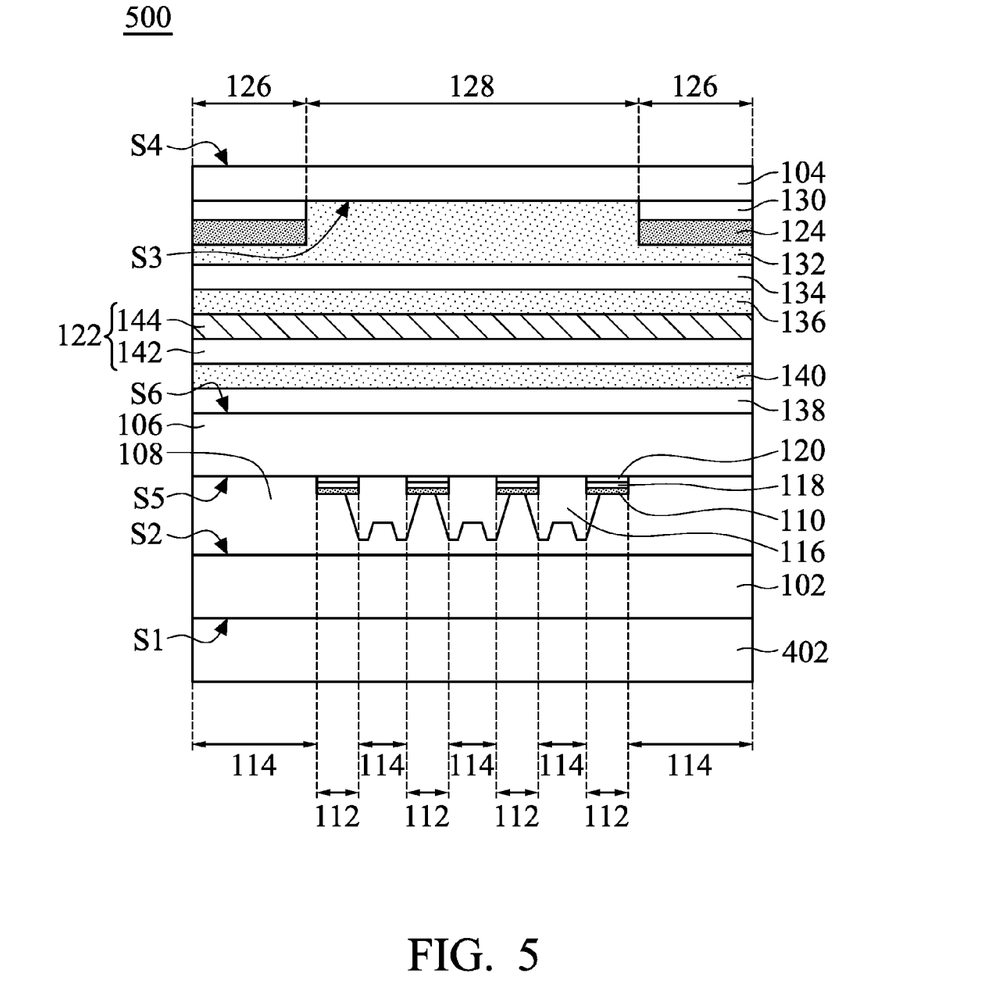
FIG. 5 is a cross-sectional view of a display device in accordance with some embodiments of the present disclosure.

It should be noted that the embodiments shown in FIG. 1 are simply used for illustration. The scope of the embodiments of the present disclosure is not limited thereto. In addition to the embodiments illustrated in the above FIG. 1, some embodiments of the present disclosure can also have other stack structures, as shown in FIGS. 2, 4 and 5, which will be discussed in detail herein. Therefore, the scope of some embodiments of the present disclosure is not limited to the embodiments illustrated in FIG. 1.

It should be noted that elements or film layers in the subsequent context which are the same or similar to those in the previous context are denoted by the same or similar reference numerals, and that their materials, methods of formation and functions are all the same or similar to those discussed in the previous context, which will, therefore, not be discussed in detail again herein.

FIG. 4 is a cross-sectional view of a display device 400 in accordance with some other embodiments of the present disclosure. As shown in FIG. 4, according to some embodiments of the present disclosure, the display device 400 further includes a first polarizing layer 134 disposed between the touch layer 122 and the second shielding layer 124 and a first adhesion layer 136 disposed between the first polarizing layer 134 and the touch layer 122.

As shown in FIG. 4, according to some embodiments of the present disclosure, the display device 400 further includes a second polarizing layer 138 disposed between the touch layer 122 and the base layer 106, and a second adhesion layer 140 disposed between the second polarizing layer 138 and the touch layer 122. In addition, when the display medium layer 108 is formed of a liquid crystal, another polarizing layer (not shown) can be disposed on the second surface S2 of the first substrate 102 in accordance with some embodiments.

To be more specific, as shown in FIG. 4, according to some embodiments of the present disclosure, the first adhesion layer 136 and the first polarizing layer 134 are disposed in sequence on an upper surface of the touch layer 122, and the second adhesion layer 140 and the second polarizing layer 138 are disposed in sequence on an lower surface of the touch layer 122.

In some embodiments of the present disclosure, the materials of the first polarizing layer 134 and the second polarizing layer 138 can include a polymer material, such as polyvinyl alcohol, cellulose acetate film, a combination thereof or any other suitable material. In some embodiments of the present disclosure, the materials the first adhesion layer 136 and the second adhesion layer 140 can include an optical gel, which is, however, not limited in the present disclosure. As long as the gel is a light transmissive gel with adhesive property, the gel is the so-called optical gel in the present disclosure.

In some embodiments of the present disclosure, the light reflectance of the display device can be further reduced and the possibility of users seeing the pattern of touch electrodes of the display device can also be reduced to raise display quality by disposing the polarizing layers on both the upper surface and the lower surface of the touch layer 122. In some embodiments of the present disclosure, the aforementioned configuration can reduce the light reflectance of the display device to about 40% of the original light reflectance. For example, before disposing the polarizing layers on the surface of the touch layer 122, the touch layer 122 contributes 1% to the light reflectance of the overall display device. After disposing the polarizing layers, the touch layer 122 contributes lower than 0.4% to the light reflectance of the overall display device. In other words, in some embodiments of the present disclosure, the aforementioned configuration can reduce 60% of the light reflectance.

In some embodiments of the present disclosure, the refractive index of the first adhesion layer 136 is between the refractive index of the first polarizing layer 134 and the refractive index of the touch layer 122. In some embodiments of the present disclosure, the refractive index of the first adhesion layer 136 is substantially equal to a half of the sum of the refractive index of the first polarizing layer 134 and the refractive index of the touch. In some embodiments of the present disclosure, by making the first adhesion layer 136 have the specific refractive index as discussed in the above, the change of refractive indices from the first polarizing layer 134, the first adhesion layer 136 to the touch layer 122 in sequence are linear. Therefore, when outside incident light penetrates the first polarizing layer 134, the first adhesion layer 136 and the touch layer 122 in sequence, the reflectance of the outside incident light can be reduced, which raises display quality.

In some embodiments, the coordination of the refractive index of each light transmissive layer can influence the reflectance of the overall display device, and the light transmissive layers can be such as a polarizing layer, a substrate, a base layer, a touch layer, or any layer of the other adhesion layers. To be more specific, when the reflectance of each light transmissive layer is smaller than 1%, the relationship between the reflectance and the refractive index can be represented by the following equation 1 to obtain the reflectance of the interface between a specific light transmissive layer and the adjacent light transmissive layer, wherein $R_B$ represents the reflectance of the specific light transmissive layer, $n_A$ represents the refractive index of the light transmissive layer exposed to ambient light earlier than the specific light transmissive layer, $n_B$ represents the refractive index of the specific light transmissive layer, and $n_C$ represents the refractive index of the light transmissive layer exposed to ambient light later than the specific light transmissive layer.

Figure 6:
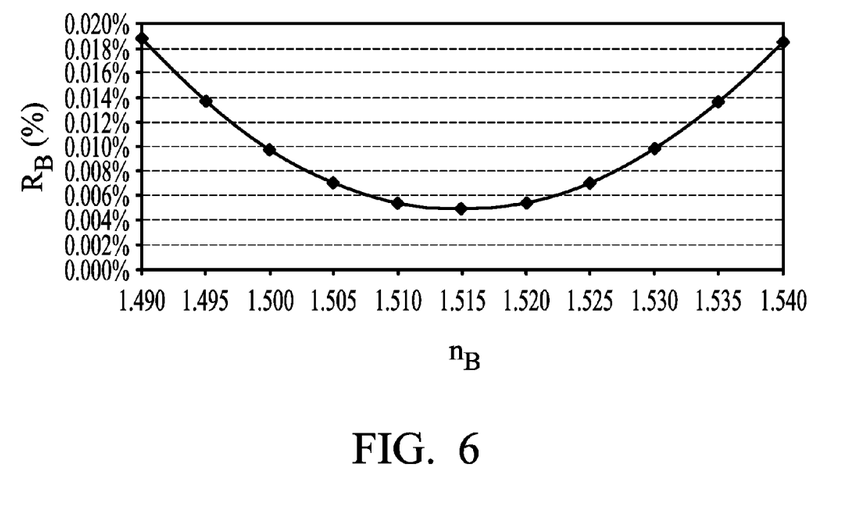
FIG. 6 is an analysis diagram of the refractive indexes and the reflectances in accordance with some embodiments of the present disclosure.

Take the embodiments of the present disclosure for example. Referring to FIG. 1, when the specific light transmissive layer is, for example, the first adhesion layer 136 and the reflectance of the first adhesion layer 136 is smaller than 1%, the reflectances of the interface of the first adhesion layer 136 and the first polarizing layer 134 and the interface of first adhesion layer 136 and the touch layer 122 can be obtained by the relationship between reflectance and refractive index described by the following equation 1. In equation 1, $R_B$ is the sum of the reflectances of the interface of the first adhesion layer 136 and the first polarizing layer 134 and the interface of the first adhesion layer 136 and the touch layer 122, $n_A$ is the refractive index of the first polarizing layer 134, $n_B$ is the refractive index of the first adhesion layer 136, and $n_C$ is the refractive index of the touch layer 122, wherein the diagram of $R_B$ versus $n_B$ can be seen in FIG. 6. In the embodiments of FIG. 6, $n_A$ is assumed to be 1.5 and $n_C$ is assumed to be 1.53. As shown in FIG. 6, when $n_B$ is 1.515, (i.e. a half of the sum of the refractive index of the first polarizing layer 134 and the refractive index of the touch layer 122), $R_B$, the reflectance of the first adhesion layer 136, has a minimum. Hence, in some embodiments of the present disclosure, the reflectance of the outside incident light can be reduced to raise display quality by making the refractive index of the first adhesion layer 136 between the refractive index of the first polarizing layer 134 and the refractive index of the touch layer 122, or even making the refractive index of the first adhesion layer 136 substantially equal to a half of the sum of the refractive index of the first polarizing layer 134 and the refractive index of the touch layer 122.

$$R_B = \left| \frac{(n_A - n_B)^2}{(n_A + n_B)^2} \right| + \left| \frac{(n_B - n_C)^2}{(n_B + n_C)^2} \right| \qquad \text{Equation 1}$$

In some embodiments of the present disclosure, the refractive index of the second adhesion layer 140 is between the refractive index of the second polarizing layer 138 and the refractive index of the touch layer 122. In some embodiments of the present disclosure, the refractive index of the second adhesion layer 140 is substantially equal to a half of the sum of the refractive index of the second polarizing layer 138 and the refractive index of the touch layer 122. In some embodiments of the present disclosure, by making the second adhesion layer 140 have the specific refractive index as discussed in the above, the change of refractive indices from the touch layer 122, the second adhesion layer 140 to the second polarizing layer 138 in sequence are linear. Therefore, when outside incident light penetrates the touch layer 122, the second adhesion layer 140, and the second polarizing layer 138 in sequence, the reflectance of the outside incident light can be reduced to raise the display quality.

Referring to FIG. 4, the display device 400 further includes a backlight module 402 disposed on the first surface S1 of the first substrate 102 in accordance with some embodiments of the present disclosure.

In some embodiments of the present disclosure, the phase retardation of the touch layer 122 is smaller than about 40 nm or greater than about 10000 nm, such as smaller than about 30 nm or greater than about 15000 nm. Making the phase retardation of the touch layer 122 within the specific range as discussed in the above can prevent the light emitted by the backlight module 402 from generating a colorful texture, thereby raising the display quality. In the disclosure, the phase retardation (measured retardation) of one layer is measured using Axostep (Axometrics) equipment according to the manual of a manufacturer based on wavelength of 550 nm.

FIG. 5 is a cross-sectional view of a display device 500 according to some other embodiments of the present disclosure. As shown in FIG. 5, according to some embodiments of the present disclosure, the touch layer 122 is disposed between the second substrate 104 and the base layer 106, and the touch layer 122 includes a third substrate 142 disposed between the second substrate 104 and the base layer 106, and a touch electrode layer 144 disposed on the third substrate 142.

To be more specific, as shown in FIG. 5, according to some embodiments of the present disclosure, the third substrate 142 is closer to the second adhesion layer 140, the second polarizing layer 138 and the base layer 106, and the touch electrode layer 144 is closer to the first adhesion layer 136, the first polarizing layer 134 and the second substrate 104. Furthermore, as shown in FIG. 5, according to some embodiments of the present disclosure, the first polarizing layer 134 is disposed between the third substrate 142 of the touch layer 122 and the second substrate 104. According to some embodiments of the present disclosure, the first polarizing layer 134 is disposed between the touch electrode layer 144 of the touch layer 122 and the second substrate 104.

In some embodiments of the present disclosure, the third substrate 142 can include a glass material layer, a ceramic material layer, a plastic material layer, or any other suitable material layer. In some embodiments of the present disclosure, the third substrate 142 can include a flexible substrate, and the material of the flexible substrate is, for example, polyethylene terephthalate (PET), polyimide, polycarbonate, a combination thereof, or any other suitable material. In some embodiments of the present disclosure, the phase retardation of the touch layer 122 can be adjusted by changing the material of the third substrate 142.

In some embodiments of the present disclosure, the touch electrode layer 144 can include a transparent conductive material, such as ITO, SnO, IZO, IGZO, ITZO, ATO, AZO, a combination thereof or any other suitable transparent conductive oxide material.

To sum up, in some embodiments of the present disclosure, by disposing the first optical adjustment layer with smaller light transmittance on the first shielding layer of the display area, the light reflectance of the display device can be reduced and the probability of users seeing the pattern of touch electrodes of the display device can be reduced as well, raising the display quality. In addition, in some embodiments of the present disclosure, a bilayered optical adjustment layer with different color filters (i.e. the first optical adjustment layer and the second optical adjustment layer), instead of a single-layered optical adjustment layer, is disposed on the first shielding layer, which can further reduce the light reflectance and the reflected light can have smaller color shift.

Moreover, in some embodiments of the present disclosure, the light reflectance of the peripheral area can be made close to or substantially equal to the light reflectance of the display area by disposing the third optical adjustment layer on the second shielding layer of the peripheral area, and the difference between the refractive index of the third optical adjustment layer and the refractive index of the second substrate. The display quality of the display device can be improved by decreasing the difference between the light reflectance of the peripheral area and the light reflectance of the display area.

It should be noted that the aforementioned sizes, parameters and shapes of the components are not limited to the present disclosure. People of ordinary skill in the art can adjust these settings according to need. In addition, the display devices of the present disclosure are not limited to the statuses illustrated in FIGS. 1 to 6. Some embodiments of the present disclosure can include one or more features of one or more embodiments of FIGS. 1 to 6. In other words, not all the features of the figures have to be implemented at the same time in the display devices of some embodiments of the present disclosure.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display device, comprising:
a first substrate having a first surface and a second surface opposite to the first surface;
a second substrate having a third surface and a fourth surface, wherein the second surface of the first substrate is opposite to the third surface of the second substrate;
a base layer disposed between the first substrate and the second substrate, wherein the base layer has a fifth surface opposite to the second surface and a sixth surface opposite to the third surface;
a first shielding layer disposed between the first substrate and the base layer and defining a first shielding region and a first non-shielding region;
a first optical adjustment layer disposed between the first shielding layer and the second substrate, wherein a thickness of the first optical adjustment layer is in a range from 1 m to 3 m, and a reflectance of the first optical adjustment layer is in a range from 0.05% to 1.2%,
a second shielding layer disposed between the base layer and the second substrate and defining a second shielding region and a second non-shielding region, wherein the first shielding region and the second shielding region at least partially overlap; and
a third optical adjustment layer disposed between the second substrate and the second shielding layer and contacting the second shielding layer, wherein the second non-shielding region has a first reflectance in an area without the third optical adjustment layer, the second substrate has a second reflectance, the second shielding layer has a third reflectance, and the third optical adjustment layer has a fourth reflectance, wherein the fourth reflectance is in a range from 90% to 100% of a value equal to the first reflectance minus the second reflectance and the third reflectance.

2. The display device as claimed in claim 1, further comprising a second optical adjustment layer, wherein the second optical adjustment layer is disposed between the base layer and the first optical adjustment layer, and the second optical adjustment layer has a thickness between 1 μm and 3 μm, and the second optical adjustment layer has a reflectance between 0.05% and 1.2%.

3. The display device as claimed in claim 1, further comprising:
a touch layer disposed between the first substrate and the second substrate;
a first polarizing layer disposed between the touch layer and the second shielding layer; and
a second polarizing layer disposed between the touch layer and the base layer, wherein the touch layer is disposed between the base layer and the second substrate, and a phase retardation of the touch layer is smaller than 40 nm or greater than 10000 nm.

4. The display device as claimed in claim 3, further comprising:
a first adhesion layer disposed between the second substrate and the first polarizing layer, wherein a refractive index of the first adhesion layer is between 1.505 and 1.525.

5. The display device as claimed in claim 1, further comprising:
a touch layer disposed between the first substrate and the second substrate;
a third substrate disposed between the base layer and the second substrate; and
a touch electrode layer disposed on the third substrate.

6. The display device as claimed in claim 5, further comprising:
a first polarizing layer disposed between the touch layer and the second shielding layer; and
a second polarizing layer disposed between the touch layer and the base layer, wherein the touch layer is disposed between the base layer and the second substrate, and a phase retardation of the touch layer is smaller than 40 nm or greater than 10000 nm.

7. The display device as claimed in claim 6, further comprising:
a first adhesion layer disposed between the second substrate and the first polarizing layer, wherein a refractive index of the first adhesion layer is between 1.505 and 1.525.

8. A display device, comprising:
a first substrate having a first surface and a second surface opposite to the first surface;
a second substrate having a third surface and a fourth surface, wherein the second surface of the first substrate is opposite to the third surface of the second substrate;
a base layer disposed between the first substrate and the second substrate, wherein the base layer has a fifth surface opposite to the second surface and a sixth surface opposite to the third surface;
an adhesion layer disposed between the base layer and the second substrate;
a first light transmissive layer disposed between the adhesion layer and the second substrate;
a second light transmissive layer disposed between the adhesion layer and the base layer, wherein a refractive index of the adhesion layer is substantially equal to a half of the sum of a refractive index of the first light transmissive layer and a refractive index of the second light transmissive layer;
a first shielding layer disposed between the first substrate and the base layer and defining a first shielding region and a first non-shielding region;
a second shielding layer disposed between the base layer and the second substrate and defining a second shielding region and a second non-shielding region, wherein the first shielding region and the second shielding region at least partially overlap; and
a third optical adjustment layer disposed between the second substrate and the second shielding layer and contacting the second shielding layer, wherein the second non-shielding region has a first reflectance in an area without the third optical adjustment layer, the second substrate has a second reflectance, the second shielding layer has a third reflectance, and the third optical adjustment layer has a fourth reflectance, wherein the fourth reflectance is in a range from 90% to 100% of a value equal to the first reflectance minus the second reflectance and the third reflectance.

9. The display device as claimed in claim 8, further comprising:
a touch layer disposed between the first substrate and the second substrate;
a third substrate disposed between the base layer and the second substrate; and
a touch electrode layer disposed on the third substrate.

10. The display device as claimed in claim 8, wherein a refractive index of the adhesion layer is between 1.505 and 1.525.

11. The display device as claimed in claim 8, wherein the first light transmissive layer is a first polarizing layer and the second light transmissive layer is a touch layer.

12. The display device as claimed in claim 11, wherein the touch layer is disposed between the base layer and the second substrate and a phase retardation of the touch layer is smaller than 40 nm or greater than 10000 nm.

13. The display device as claimed in claim 12, wherein the phase retardation of the touch layer is smaller than 30 nm or greater than 15000 nm.

14. The display device as claimed in claim 8, further comprising: a first optical adjustment layer disposed between the first shielding layer and the second substrate, wherein the first optical adjustment layer has a thickness between 1 m and 3 m, and the first optical adjustment layer has a reflectance between 0.05% and 1.2%.

15. The display device as claimed in claim 14, further comprising:
a second optical adjustment layer disposed between the base layer and the first optical adjustment layer, wherein the second optical adjustment layer has a thickness between 1 μm and 3 μm, and the second optical adjustment layer has a reflectance between 0.05% and 1.2%.

* * * * *